United States Patent
Danker et al.

[11] Patent Number: 5,971,541
[45] Date of Patent: *Oct. 26, 1999

[54] CORRECTION OF ASTIGMATISM USING ROTATIONALLY SYMMETRIC CONTACT LENSES

[76] Inventors: Frederick J. Danker, P.O. Box 1899, Sarasota, Fla. 34230-1899; J. Warren Blaker, 3117 Palisade Ave., Bronx, N.Y. 10463-1013

[*] Notice: This patent issued on a continued prosecution application filed under 37 CFR 1.53(d), and is subject to the twenty year patent term provisions of 35 U.S.C. 154(a)(2).

[21] Appl. No.: 08/655,015

[22] Filed: May 29, 1996

[51] Int. Cl.$^6$ .................. G02C 7/04; G02C 7/02
[52] U.S. Cl. ................ 351/160 R; 351/160 H; 351/176; 351/177
[58] Field of Search .................... 351/160 R, 160 H, 351/161, 176, 177

[56] References Cited

U.S. PATENT DOCUMENTS

| | | | |
|---|---|---|---|
| 3,594,074 | 7/1971 | Rosen | 351/219 |
| 4,103,992 | 8/1978 | Breger et al. | 351/177 |
| 4,211,476 | 7/1980 | Brummel et al. | 351/160 R |
| 4,318,595 | 3/1982 | Van der Kolk et al. | 351/160 H |
| 4,555,372 | 11/1985 | Kunzler et al. | 264/2.1 |
| 4,580,882 | 4/1986 | Nuchman et al. | 351/161 |
| 4,593,981 | 6/1986 | Scilipoti | 351/161 |
| 4,666,249 | 5/1987 | Bauman et al. | 351/160 H |
| 4,884,482 | 12/1989 | Council | 82/1.11 |
| 4,890,912 | 1/1990 | Visser | 351/161 |
| 5,066,431 | 11/1991 | Briggs et al. | 264/2.1 |
| 5,076,683 | 12/1991 | Glick | 351/160 H |
| 5,100,225 | 3/1992 | Rothe | 351/160 H |
| 5,125,728 | 6/1992 | Newman et al. | 351/160 H |
| 5,125,729 | 6/1992 | Mercure | 351/161 |
| 5,220,359 | 6/1993 | Roffman | 351/177 |
| 5,300,262 | 4/1994 | Glick | 264/2.1 |
| 5,455,641 | 10/1995 | Hahne et al. | 351/176 |

*Primary Examiner*—Georgia Epps
*Assistant Examiner*—Jordan M. Schwartz
*Attorney, Agent, or Firm*—Morgan & Finnegan, L.L.P.

[57] ABSTRACT

A rotationally symmetric contact lens has a reservoir formed centrally on the posterior surface thereof to provide an additional optical power of up to 1.51 diopters. The reservoir may be spherically or aspherically shaped.

15 Claims, 1 Drawing Sheet

CORRECTION OF ASTIGMATISM USING ROTATIONALLY SYMMETRIC CONTACT LENSES

FIELD OF THE INVENTION

The present invention relates generally to the field of optics and, more specifically, to a method and apparatus of correcting an astigmatism using rotationally symmetric contact lenses. The lenses have a central reservoir on the posterior surface which can be either spherical or aspherical. The reservoir provides an additional spherical power centrally for the lens.

BACKGROUND OF THE INVENTION

An astigmatism is a defect of the eye in which light from a point source produces a line image on the retina. This condition arises when the cornea or the crystalline lens is not perfectly spherical.

It has been known to correct astigmatism with lenses having different curvatures in two mutually perpendicular directions. Such a lens would have meridians of least and greatest curvature located at right angles to one another on the same surface. This is known as a toroidal surface, and a lens having this geometry is referred to as "toric."

The correction of astigmatism has typically involved using lenses, spectacle or contact, which have a toric surface. A variety of prior art toric lens configurations are known.

U.S. Pat. No. 5,220,359 to Roffman describes a lens for correcting myopia, presbyopia, astigmatism and other focusing problems, in which the lens has a rotationally symmetric, aspheric convex front surface and a concave, spheric back surface. The front surface is defined according to a specific Fourier Transform function.

U.S. Pat. No. 5,300,262 to Glick describes a process for spincasting a compound contact lens having toric surfaces. The lens uses a compound anterior surface to correct vision.

U.S. Pat. No. 5,100,225 to Rothe describes a contact lens having compound anterior surfaces and a smooth, concave posterior surface.

Other patents showing various forms of contact lenses include the following: U.S. Pat. Nos. 5,066,431; 4,884,482; 4,666,249; 4,580,882; 4,211,476; 4,318,595; and 4,555,372.

In spite of the above-noted disclosures, a continuing need exists for a contact lens capable of correcting astigmatism.

SUMMARY OF THE INVENTION

An object of the present invention is to provide a lens for correcting astigmatism which employs a rotationally symmetric geometry.

Another object of the present invention is to provide a method of correcting astigmatism without using toric lenses.

These and other objects are achieved by providing a lens having a substantially convex anterior surface, a substantially concave posterior surface, and a reservoir formed centrally in the posterior surface. The reservoir provides an additional spherical power as a corrective element for astigmatism, but the power is less than 1.51 diopters. Thus, there will be no substantive effect on the functioning of the lens as a corrective element.

Other objects, advantages and salient features of the invention will become apparent from the following detailed description, which, taken in conjunction with the annexed drawings, discloses preferred but non-limiting embodiments of the invention.

DETAILED DESCRIPTION OF THE INVENTION

Figure 1:
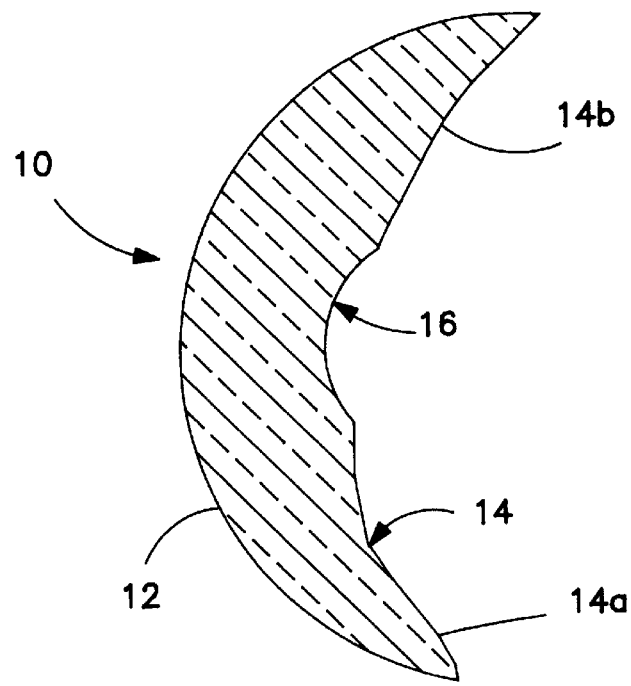
FIG. 1 is a vertical, cross sectional view of a contact lens according to a preferred embodiment of the invention, taken along line II—II of FIG. 2.
Figure 2:
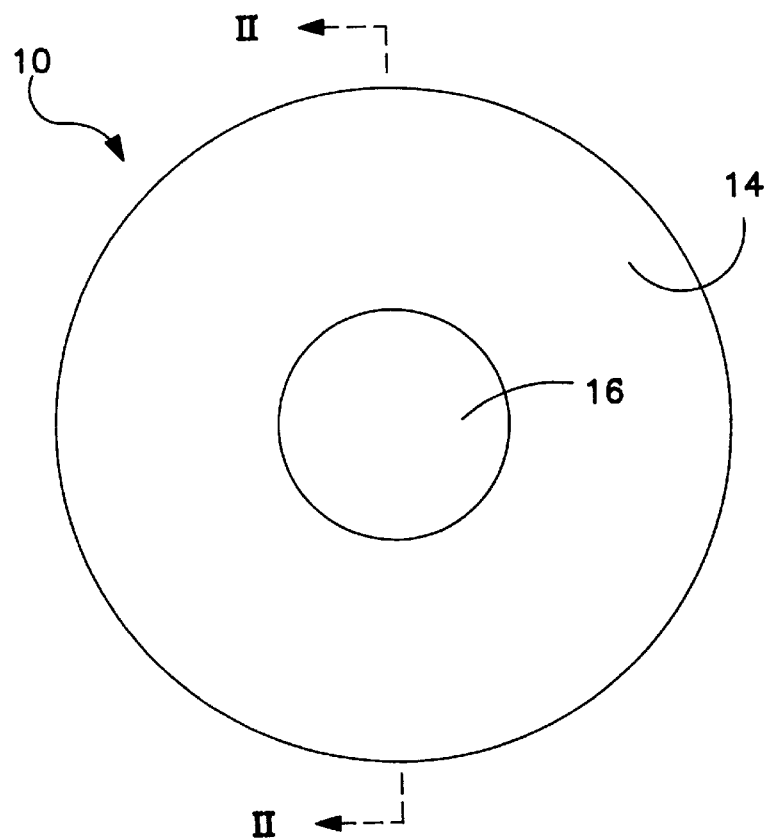
FIG. 2 is a rear view of the contact lens of FIG. 1.

Referring to FIGS. 1 and 2, a rotationally symmetric contact lens 10 has an anterior surface 12 which is substantially convex and a posterior surface 14 which is substantially concave. The anterior surface 12 is the power curve, and the posterior surface 14 may have a fitting curve portion 14a and a base curve portion 14b.

A reservoir 16 is located centrally, and formed integrally, in the posterior surface 14. The reservoir may be spherical or aspherical in configuration. The reservoir is critical to the functioning of the lens 10 as a corrective element for astigmatism. The reservoir provides an additional spherical power centrally for the lens but the power of this reservoir will be less than 1.51 diopters and thereby will not substantively effect the functioning of the lens 10 as a corrective element.

The center thickness of the lens will be sufficient to maintain the shape of the reservoir region and can range from 0.08 mm to 2.0 mm, although the smallest center thickness consistent with good fitting practice will be preferred.

The lens 10 can have either spherical or aspherical surfaces or combinations thereof as required for fitting and for correction. They can be made with a full range of corrective powers. Moreover, the lenses can be made of either soft or hard material, with the soft lenses having a substantive water content. The lenses are capable of correcting astigmatism using non-toric surfaces.

While advantageous embodiments have been chosen to illustrate the subject invention, it will be understood by those skilled in the art that various changes and modifications can be made therein without departing from the scope of the invention as defined by the appended claims.

What is claimed is:

1. A rotationally symmetric contact lens comprising:
   a rotationally symmetric substantially convex anterior surface;
   a rotationally symmetric substantially concave posterior surface; and
   a reservoir having a substantially concave surface and being disposed centrally in the posterior surface, the diameter of the reservoir being substantially less than the diameter of the posterior surface of the lens, the reservoir being shaped to provide additional optical power centrally, and shaped to provide optical correction for an astigmatic condition, the shape of the reservoir is selected to provided an optical power of less then 1.51 diopters,
   wherein the substantially concave posterior surface has an outer peripheral rim engageable with the eye which is substantially smooth and non-channeled.

2. A rotationally symmetric contact lens according to claim 1, wherein the reservoir is spherical in shape.

3. A rotationally symmetric contact lens according to claim 1, wherein the reservoir is aspherical in shape.

4. A rotationally symmetric contact lens according to claim 1, wherein the anterior surface is aspherical and the posterior surface external to the reservoir is aspherical.

5. A rotationally symmetric contact lens according to claim 1, wherein the anterior surface is spherical and the posterior surface external to the reservoir is spherical.

6. A rotationally symmetric contact lens according to claim 1, wherein the anterior surface is spherical and the posterior surface external to the reservoir is aspherical.

7. A rotationally symmetric contact lens according to claim 1, wherein the lens is made of a soft, hydrophillic polymeric material.

8. A rotationally symmetric contact lens according to claim 1, wherein the lens is made of a hard hydrophobic material.

9. A rotationally symmetric contact lens according to claim 1, wherein the anterior surface is aspherical and the posterior surface external to the reservoir is spherical.

10. A method of correcting astigmatism comprising the steps of:

forming rotationally symmetric anterior and posterior surfaces of a corneal contact lens to provide fitting and optical power;

forming a reservoir in the posterior surface of the contact lens, said reservoir being shaped to provide an additional optical power centrally and shaped to provide optical correction for an astigmatic condition, the shape of the reservoir is selected to provide an optical power of less than 1.51 diopters;

wherein the diameter of the reservoir is substantially less than the diameter of the posterior surface of the lens; and wherein the substantially concave posterior surface has an outer peripheral rim engageable with the eye which is substantially smooth and non-channeled.

11. A method according to claim 10, wherein the reservoir has a spherical shape.

12. A method according to claim 10, wherein the reservoir has an aspherical shape.

13. A method according to claim 10, wherein the anterior surface is spherical and the posterior surface external to the reservoir is spherical.

14. A method according to claim 10, wherein the anterior surface is spherically shaped and the posterior surface external to the reservoir is aspherically shaped.

15. A method according to claim 10, wherein the anterior surface is aspherically shaped and the posterior surface external to the reservoir is spherically shaped.

* * * * *